US00RE42031E

(19) United States
(12) Reissued Patent
Trestain

(10) Patent Number: US RE42,031 E
(45) Date of Reissued Patent: Jan. 18, 2011

(54) PNEUMATICALLY ACTUATED BELTLESS CONVEYOR

(76) Inventor: Dennis Trestain, 11522 Ray Dr., Ocqueoc, MI (US) 49759

(21) Appl. No.: 11/799,027

(22) Filed: Apr. 30, 2007

Related U.S. Patent Documents

Reissue of:
(64) Patent No.: 7,083,042
Issued: Aug. 1, 2006
Appl. No.: 11/053,552
Filed: Feb. 8, 2005

U.S. Applications:

(63) Continuation of application No. 10/256,665, filed on Sep. 27, 2002, now Pat. No. 6,988,611, and a continuation of application No. 10/277,452, filed on Oct. 22, 2002, now Pat. No. 6,899,218, which is a continuation-in-part of application No. 10/256,665, filed on Sep. 27, 2002, now Pat. No. 6,988,611, which is a continuation of application No. PCT/US01/11783, filed on Apr. 10, 2001.
(60) Provisional application No. 60/195,929, filed on Apr. 10, 2000.
(51) Int. Cl.
*B65G 25/04* (2006.01)

(52) U.S. Cl. ..... 198/750.7; 198/750.1; 198/955
(58) Field of Classification Search ..... 198/750.1, 198/750.5, 750.7, 955
See application file for complete search history.

(56) References Cited

U.S. PATENT DOCUMENTS

| | | | | |
|---|---|---|---|---|
| 1,146,947 | A | | 7/1915 | Norton |
| 1,343,648 | A | | 6/1920 | Smith |
| 2,214,755 | A | | 9/1940 | Tafel |
| 2,378,979 | A | | 6/1945 | Burt |
| 2,473,193 | A | | 6/1949 | Campion |
| 2,800,857 | A | | 7/1957 | Yarmak |
| 3,212,630 | A | | 10/1965 | Allen et al. |
| 3,712,472 | A | | 1/1973 | Elliott |
| 4,192,419 | A | | 3/1980 | Brodin |
| 4,505,380 | A | | 3/1985 | McLemore et al. |
| 4,508,208 | A | | 4/1985 | Preedy |
| 4,854,444 | A | | 8/1989 | Iwamoto |
| 5,064,046 | A | | 11/1991 | Janotik et al. |
| 5,147,031 | A | | 9/1992 | Carpenter |
| 5,489,018 | A | | 2/1996 | Foster |
| 5,588,522 | A | | 12/1996 | Foster et al. |
| 5,794,757 | A | | 8/1998 | Svejkovsky et al. |
| 5,850,906 | A | | 12/1998 | Dean |
| 6,026,949 | A | | 2/2000 | Foster |
| 6,056,113 | A | | 5/2000 | Foster |
| 6,189,683 | B1 | | 2/2001 | Svejkovsky et al. |
| 6,209,713 | B1 | | 4/2001 | Takahashi et al. |
| 6,237,748 | B1 | | 5/2001 | Kroger |
| 6,311,832 | B1 | | 11/2001 | Kwasniewicz et al. |
| 6,439,374 | B2 | | 8/2002 | Kroger |
| 6,439,375 | B1 | | 8/2002 | Foster et al. |
| 6,722,492 | B2 | | 4/2004 | Trestain |
| 6,749,057 | B2 | | 6/2004 | Kato |
| 6,796,918 | B1 | | 9/2004 | Cinquin et al. |
| 6,880,693 | B2 | | 4/2005 | Trestain |
| 6,899,218 | B2 | * | 5/2005 | Kwasniewicz et al. ... 198/750.7 |
| 6,988,611 | B2 | | 1/2006 | Kwasniewicz et al. |
| 7,290,648 | B2 | * | 11/2007 | Buonomo ..... 198/750.2 |
| 2003/0226743 | A1 | | 12/2003 | Trestain |

* cited by examiner

*Primary Examiner*—Douglas A Hess
(74) *Attorney, Agent, or Firm*—Mary M. Moyne; Fraser Trebilcock Davis & Dunlap, P.C.

(57) ABSTRACT

A pneumatically actuated, beltless conveyor assembly includes a housing, a drive system supported by the housing and at least one transport tray supported by the housing and operatively connected to the drive system. The drive system includes a seal-less pneumatic engine having at least one pair of opposed, pneumatic drive bellow assemblies. One of the drive bellow assemblies acts to drive the transport tray in one direction at a first predetermined speed to advance materials supported on the transport tray in the direction of the length of the tray. The other of the pair of drive bellow assemblies acts to drive the transport tray in a second direction opposite to the first direction and at a second, predetermined speed that is different from the first predetermined speed such that the transport tray moves relative to the material supported thereon.

14 Claims, 8 Drawing Sheets

PNEUMATICALLY ACTUATED BELTLESS CONVEYOR

Matter enclosed in heavy brackets [ ] appears in the original patent but forms no part of this reissue specification; matter printed in italics indicates the additions made by reissue.

This application is a continuation of U.S. Ser. No. 10/256,665, filed Sep. 27, 2002 and is a continuation of U.S. Ser. No. 10/277,452, filed Oct. 22, 2002, now U.S. Pat. No. 6,899,218, which is a continuation-in-part of U.S. Ser. No. 10/256,665, filed Sep. 27, 2002, which is a continuation of PCT Application No. PCT/US01/11783, filed Apr. 10, 2001, which claims the benefit of U.S. Provisional Application No. 60/195,929, filed Apr. 10, 2000.

BACKGROUND OF THE INVENTION

1. Field of the Invention

The present invention is directed toward beltless conveyors and, more specifically, to a pneumatically actuated beltless conveyor.

2. Description of the Related Art

Conveyors are well known material handling devices that have application in a wide variety of environments for transporting objects from one place to another. For example, one type of conveyor employs a belt formed into an endless loop which is entrained about at least a pair of rollers spaced apart from one another and usually located at the opposed marginal ends of the conveyor. The rollers have sprockets at either end thereof. The spaced rollers are interconnected by a pair of chains entrained about the sprockets at either end of the rollers. An electric or hydraulic motor is usually employed to power the sprockets and continuously moves the belt over a substantial length of the conveyor between the rollers. In this way, objects may be transported by the conveyor over its length.

Conveyors find application in manufacturing environments. For example, in metal stamping operations, conveyors are employed to move parts between successive presses or from a press into a bin. In addition, conveyors are used for inspecting, transporting and assembly situations and can assist in maximizing production by removing parts, slugs or other scrap and materials from under low clearance areas like punch press dies and permitting continuous operation of the press. However, belted conveyors suffer from the disadvantage that the belts are often cut by the sharp edges of the metal parts formed in stamping operations. The useful life of the belts are reduced and the belts must be replaced more frequently. Frequent belt replacement increases the maintenance costs of the stamping operation. Further, stamped parts and other debris may pass through the damaged belts and jam or foul the inner workings of the conveyor drive system.

In part to avoid these problems, beltless conveyors are often employed in certain manufacturing operations. One type of beltless conveyor known in the related art employs magnets to move ferromagnetic parts along the length of the conveyor. Metal parts are supported on a stainless steel or other non-magnetic slide surface. A plurality of strong magnets are movably supported at spaced increments beneath the non-magnetic slide surface along the length of the conveyor. The magnets cause the metal parts to be moved along the slide surface of the conveyor. Beltless magnetic conveyors obviously do not suffer from cuts or worn belts and thus have been adopted in numerous manufacturing environments. Water-tight beltless magnetic conveyors have even been submerged in coolant used in drilling, boring or other metal cutting operations. The magnetic conveyors clean the used coolant of metal or ferromagnetic contaminants so that the coolant may be recycled.

While magnetic conveyors have overcome significant problems associated with the belted conveyors of the related art, disadvantages still exist. Drive systems in both belted and magnetic beltless conveyors employ expensive and complex components. The complexity and expense of such drive systems has become a major factor in limiting the use of conveyors in industry today. Further, as the drive systems have become more complex, the risk that any given component may break, jam or fail has also increased. Conveyors presently employed in the related art are heavy pieces of machinery which are not often portable. In fact, after two to three years, magnetic conveyors are often discarded rather than reused in a different manufacturing line.

Thus, there remains a need in the art for a conveyor that is not susceptible to external damage from including, but not limited to, sharp edges of metal stampings, turnings, chips or parts, which at the same time, does not require a relatively complex drive system that is susceptible to internal damage caused by a failure of complex components. Further, there remains a need in the art for such a conveyor that presents a thin profile, is lightweight and that is also cost-effective.

Partly in response to this need, pneumatically actuated conveyors, commonly referred to as transporters, were developed in the related art. The pneumatic engines are typically mounted to a steel tray designed to convey or transport parts. When compressed air is fed into the transporter, reciprocating forward and reversing motion is created. A critical aspect of this conveying method is the control of the forward and reversing speed and motion cycle. Attaching a tray to this device allows materials to slide along the length of the tray parallel to the forward/reversing direction. This method of conveying materials provides a very cost competitive alternative to belted and magnetic beltless conveyors.

Transporters are very portable, lightweight, small in size and affordable. Trays attached to the transporter can be designed to fit a number of application requirements at a very inexpensive cost. This enables a single transporter to fit a variety of applications, as needs change by simply changing the tray attached to the transporter in applications such as tool changes on a metal stamping press.

Transporters presently employed in the related art utilize compressed air and air seals to operate the pneumatic engine movement. Control of the air in the transporter engine is critical to its effective conveying capability. If the air seal becomes worn or damaged, the transporter will fail to convey materials on the tray. Due to this disadvantage, transporters presently employed in the related art are sold with replacement seal kits to maintain the proper control of forward and reversing speed and motion cycle. Replacing seals requires downtime of production process machinery and man-hour labor costs. These costs can often exceed the original cost of the transporter the first time a seal kit is required.

Thus, there continues to be a need in the art for a pneumatically actuated beltless conveyor which presents a thin profile, is lightweight, which does not require the replacement of its engine seals, but which is long lasting as well as cost-effective.

SUMMARY OF THE INVENTION

The present invention overcomes these disadvantages in the related art in a pneumatically actuated, beltless conveyor assembly including a housing, a drive system supported by the housing and a transport tray also operatively supported by the housing. The drive system includes a seal-less pneumatic engine having at least one pair of opposed pneumatic drive bellow assemblies. One of the pair of pneumatic drive bellow assemblies acts to drive the transport tray in one direction at a first predetermined speed in such a way that the materials supported on the transport tray are moved or advanced in the direction of the length of the tray. The other one of the pair of pneumatic drive bellow assemblies acts to drive the transport tray in a second direction that is opposite to the first direction and does so at a second, predetermined speed that is different than the first predetermined speed such that the transport tray moves relative to the material supported thereon.

In this way, materials such as metal stampings, chips, turning as well as parts are advanced over the length of the conveyor until they are discharged. The repeated, rectilinear movement of the drive system, but at different forward and reverse speeds, moves material in the direction of the conveyor. No sprockets are required which greatly reduces the thickness of the conveyor. There is no heavy motor nor motor mounts required to drive the conveyor. In addition, the conveyor of the present invention is lightweight, thin, relatively inexpensive and is robust and efficient in operation.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

One embodiment of the pneumatically actuated beltless conveyor of the present invention is generally indicated at 10 in FIGS. 1 through 5, where like numerals are used to designate like structure throughout the drawings. The conveyor 10 may be employed in any number of applications and neither the preceding discussion nor the description of the invention which follows should be interpreted as limiting the present use of the invention.

Figure 1:
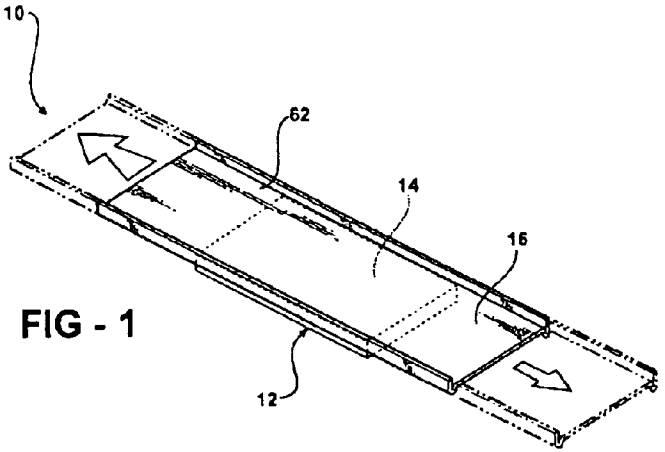
FIG. 1 is a perspective view of one embodiment of the pneumatically actuated beltless conveyor of the present invention.
Figure 2:
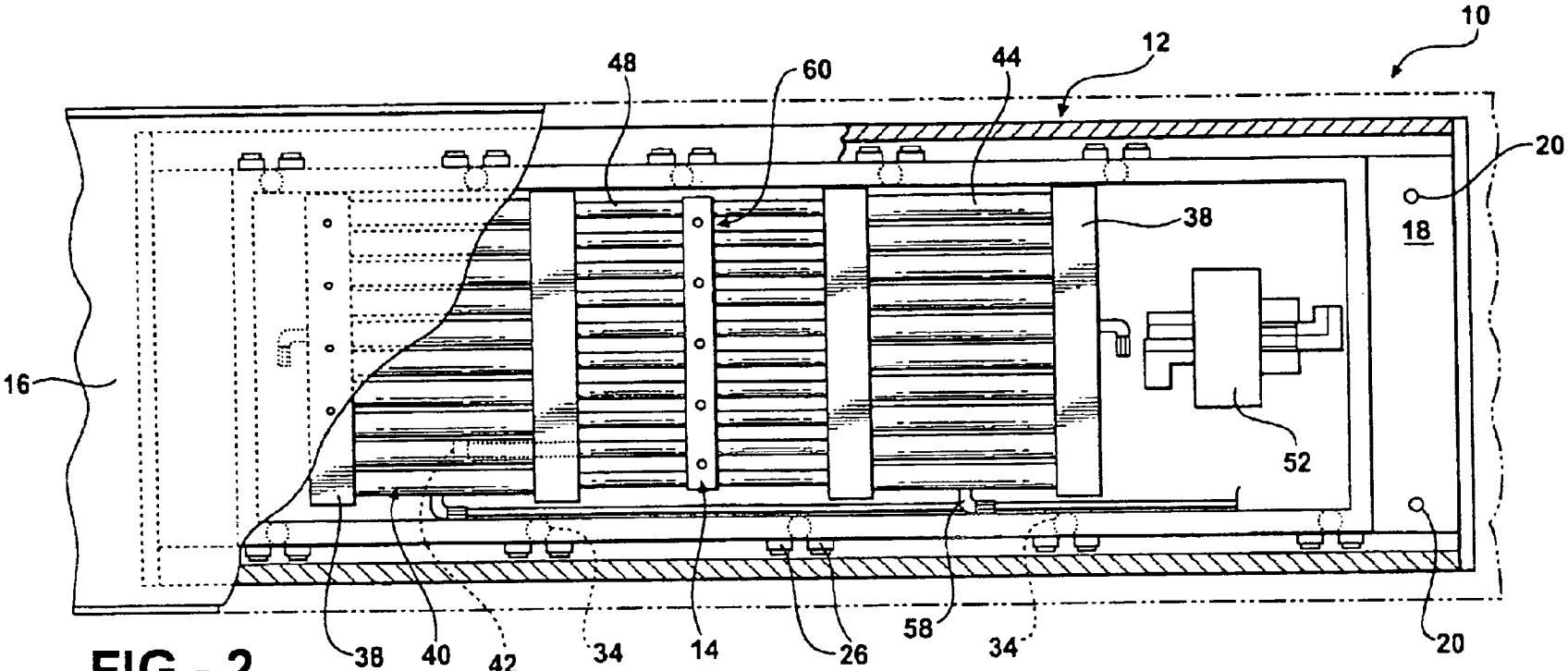
FIG. 2 is a partially cut-away top view of one embodiment of the pneumatically actuated beltless conveyor of the present invention.
Figure 3:
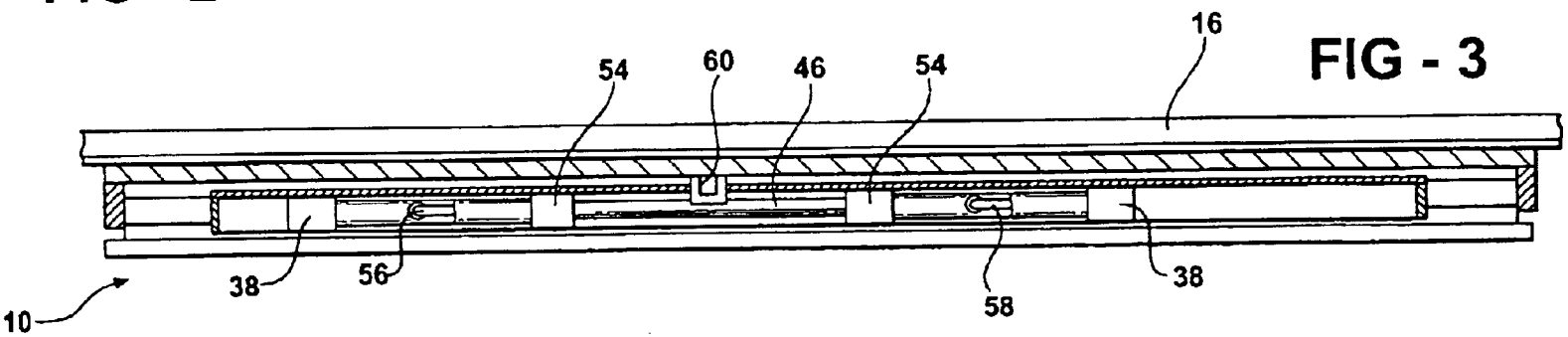
FIG. 3 is a cross-sectional side view of one embodiment of the pneumatically actuated beltless conveyor of the present invention.

Referring now to FIG. 1, the conveyor 10 of the present invention includes a housing, generally indicated at 12 and a drive system, generally indicated at 14 which is supported by the housing 12. As best shown in FIGS. 1–3, a transport tray, also known as a rigidized shaker pan, generally indicated at 16, is operatively supported by the housing 12 as will be described in greater detail below. The drive system 14 includes a seal-less pneumatic engine which acts to impart repeated, rectilinear movement to the transport tray 16 so as to advance materials supported by the tray 16 in the direction of its longitudinal length. As best shown in FIG. 2, the housing 12 includes a bottom mount plate 18 which includes suitable apertures 20 and other structure (not shown) adapted to mount the conveyor assembly 10 into a press or any other environment in which the conveyor may be employed. In addition, the apertures 20 may be used to mount the drive system 14 within the housing 12.

Figure 4:
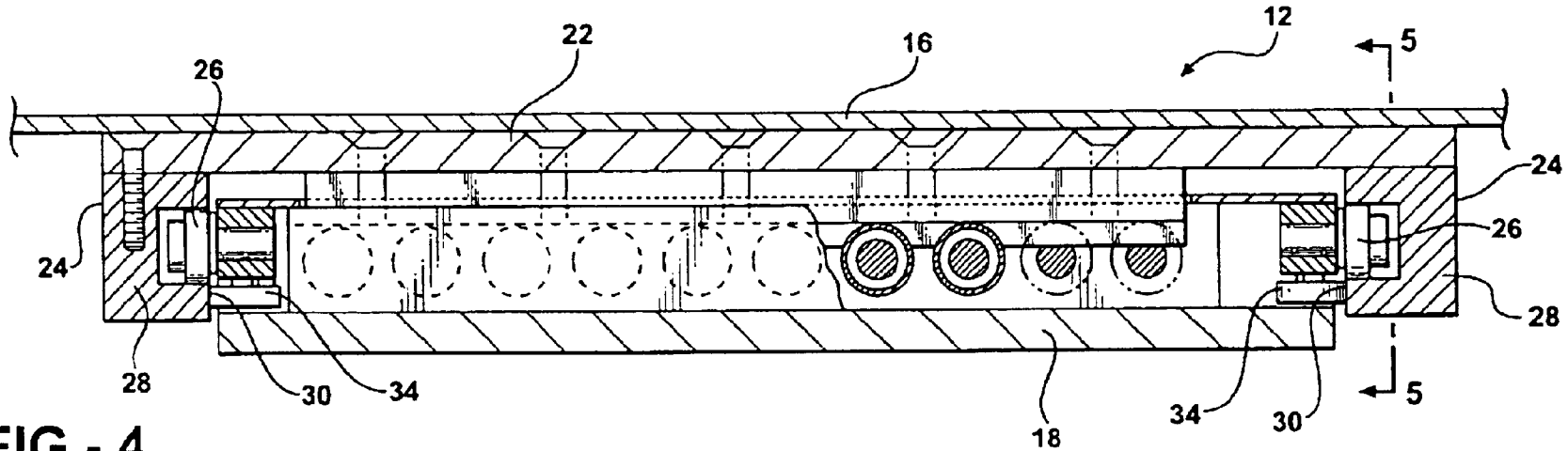
FIG. 4 is a cross-sectional end view of the pneumatically actuated beltless conveyor illustrated in FIG. 3.
Figure 5:
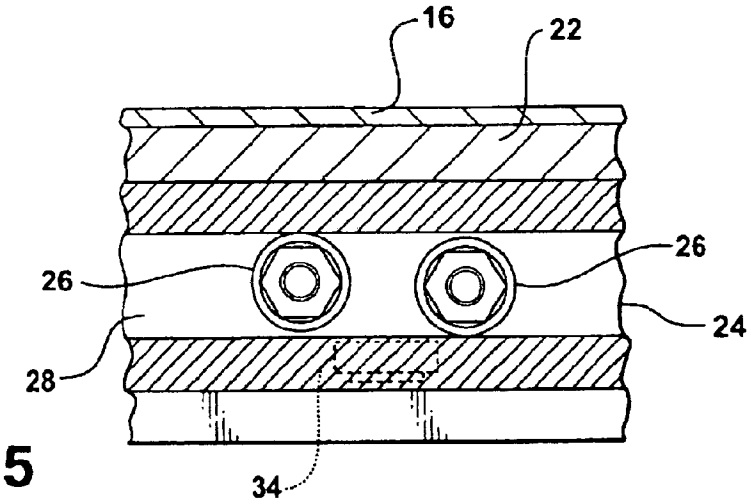
FIG. 5 is a partial cross-sectional side view taken substantially along lines 5—5 of FIG. 4.

As best shown in FIGS. 4 and 5, a slider top plate 22 is movably supported relative to the bottom mount plate 18. To this end, the slider top plate 22 includes a pair of depending side tracks, generally indicated at 24 extending along a portion of the longitudinal length of the slider top plate 22. Each side track 24 is adapted to cooperate with a plurality of bearing clusters, generally indicated at 26, which support the slider top plate 22 relative to the bottom plate 18. More specifically, in the preferred embodiment illustrated in FIGS. 4 and 5, the side tracks 24 define a U-shaped track 28 and a rail 30. Each bearing cluster 26 includes one or more bearings 32 which are rotatable about a horizontal axis and received within the U-shaped tracks 28. The bearings 32 facilitate smooth movement of the slider top plate 22 without deviation in a direction transverse to the horizontal plane containing the axis of rotation of the bearings 32. Each bearing cluster 26 also includes one or more bearings 34 that are rotatable about a vertical axis and that rotatably engage the rail 30. The bearings 34 facilitate smooth movement of the slider top plate 22 without deviation in a direction transverse to the horizontal plane containing the axis of rotation of the bearings. Thus, the bearing clusters 26 cooperate with corresponding structure on the slider top plate 22 to ensure smooth, repeatable, rectilinear motion of the slider top plate 22 relative to the bottom plate 14.

One embodiment of the drive system 14 is generally illustrated in FIGS. 2–3. The drive system 14 of the present invention is, in essence, a seal-less, pneumatic engine which eliminates the need to replace seals which frequently wear out in other conveyors known in the related art. To this end, the drive system 14 includes a pair of end manifolds 38 and a plurality of cylinders 40 extending therebetween. Each end manifold 38 includes an air inlet 39 which is operatively connected to a source of pressurized air (not shown but commonly known in the art). Within each cylinder 40 there is supported a pair of bi-directional pistons 42, 44 and a push rod 46 extending therebetween. A push rod guide 48, 50, which in the preferred embodiment may take the form a round Delrin ball, extends between the pistons 42, 44 and the push rods 46, respectively. A control valve 52 is employed to sequentially cycle pressurized air against alternating pistons 42, 44, so as to reciprocally move the pistons 42, 44 within the cylinders 40. Furthermore, the pressure applied to the pistons 42, 44 is controlled so that the movement in one direction, such as the direction of part movement on the conveyor 10, is relatively slow and so that movement in the opposite direction is relatively fast. A pair of center manifolds 54 span the transverse width of the plurality of cylinders 40 and are located between the pair of pistons 42, 44 to vent cylinder air to the atmosphere. However, those having ordinary skill in the art will appreciate that the relative speeds (faster in one direction, slower in the opposite direction) selected for forward and rearward movement of the transport tray 16 may be reversed and still cause the material or part supported on the transport tray 16 to move in the direction of the conveyor 10. This is achieved due to the inertia of the material or part that tends to cause movement in the direction of the conveyor even as the direction of movement of the transport tray 16 is reversed.

At least one of the cylinders 40 includes a pair of stroke control orifices 56, 58 disposed spaced relative to one another in the direction of the longitudinal length of the conveyor. Movement of a piston 42 past an associated orifice 56 signals the control valve 52 to reverse direction of the pressurized air to the opposite end manifold 38. This, in turn, reverses the direction of the movement of the pistons 42, 44. The similar, but opposite effect results when the piston 44 moves past the associated orifice 58. Thus, the drive system 14 of the present invention includes a seal-less pneumatic engine having a series of bi-directional pistons 42, 44 which are movable simultaneously within a plurality of adjacent cylinders 40, all of which are supported in a common plane.

The drive system 14 further includes a free-floating drive dog assembly, generally indicated at 60 in FIGS. 2 and 3. The drive dog assembly 60 includes ringers (not shown) which fit around ring grooves (also not shown) formed in the push rods 46 associated with the pistons 42, 44. The drive dog 60 is self-aligning and acts as a flexible link which interconnects the pneumatic engine to the transport tray 16 via the slider top plate 22. This flexible link acts to isolate the push rods 46 from vibrations which could otherwise be transmitted to the engine thereby causing stress and possibly premature failure.

The rhythmic, repeating, rectilinear movement of the engine is imparted to the transport tray 16 which is supported for movement with the slider top plate 22. The transport tray 16 may define any geometric shape and can be fabricated in a number of ways to fit the particular applications at hand. As illustrated in FIG. 1, the transport tray 16 has an elongated, rectangular shape with a pair of upstanding flanges 62 extending for a substantial portion of its longitudinal length.

Figure 6:
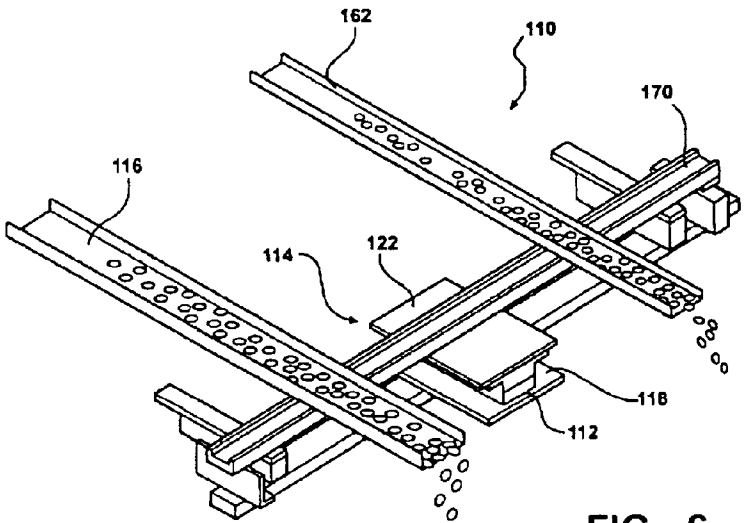
FIG. 6 is a perspective view of an alternate embodiment of the pneumatically actuated beltless conveyor of the present invention.
Figure 7:
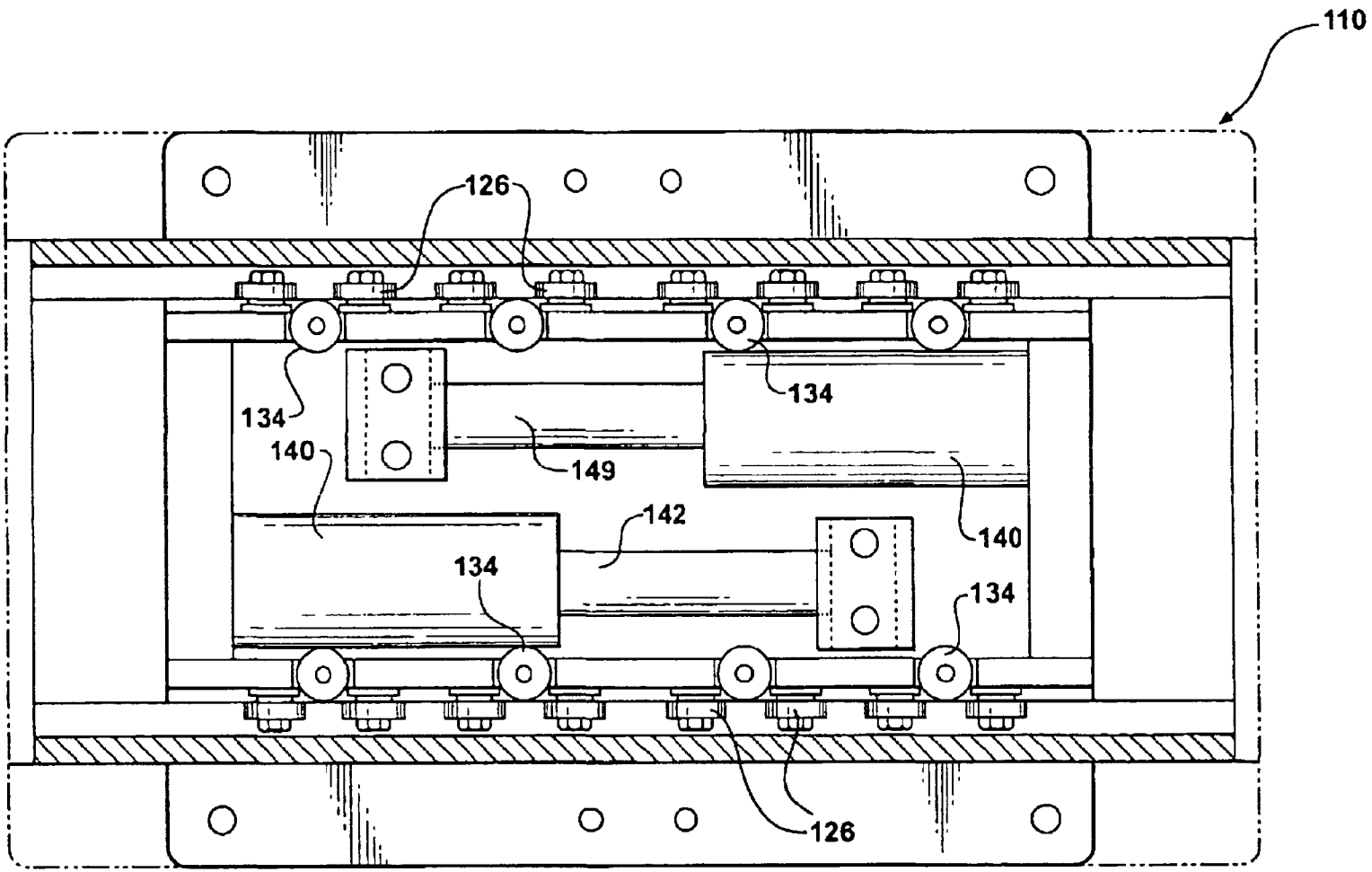
FIG. 7 is a top view of an alternate embodiment of the pneumatically actuated beltless conveyor of the present invention illustrating the drive system.
Figure 8:
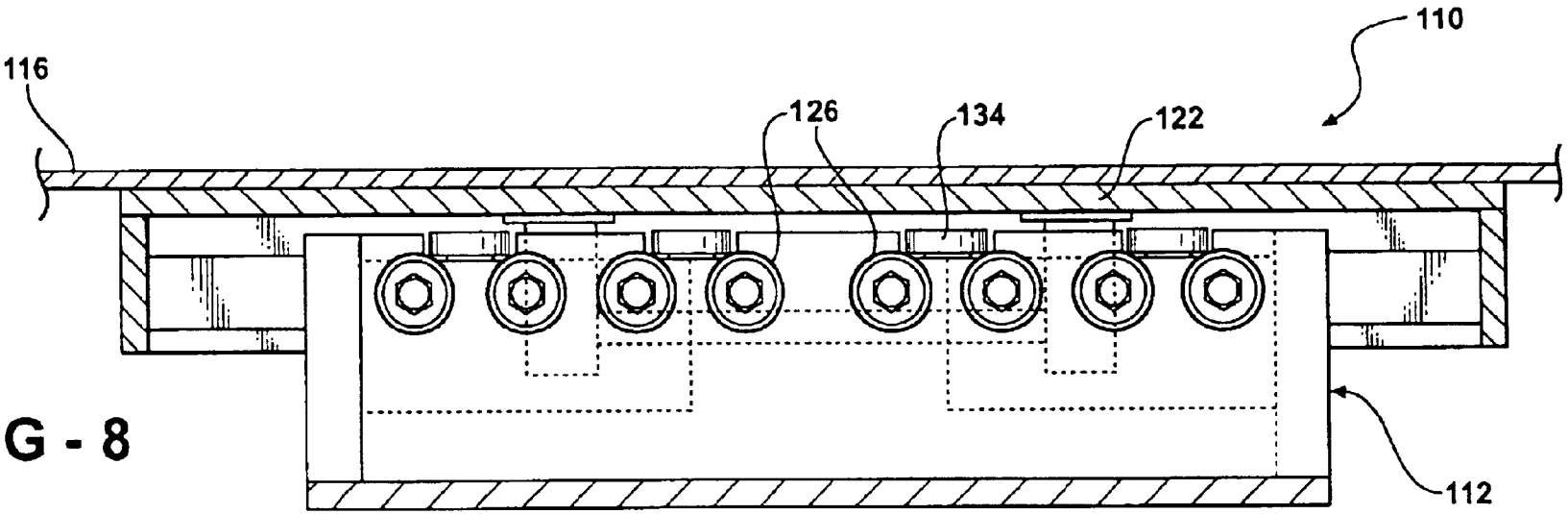
FIG. 8 is a cross-sectional side view of the pneumatically actuated beltless conveyor illustrated in FIG. 7.
Figure 9:
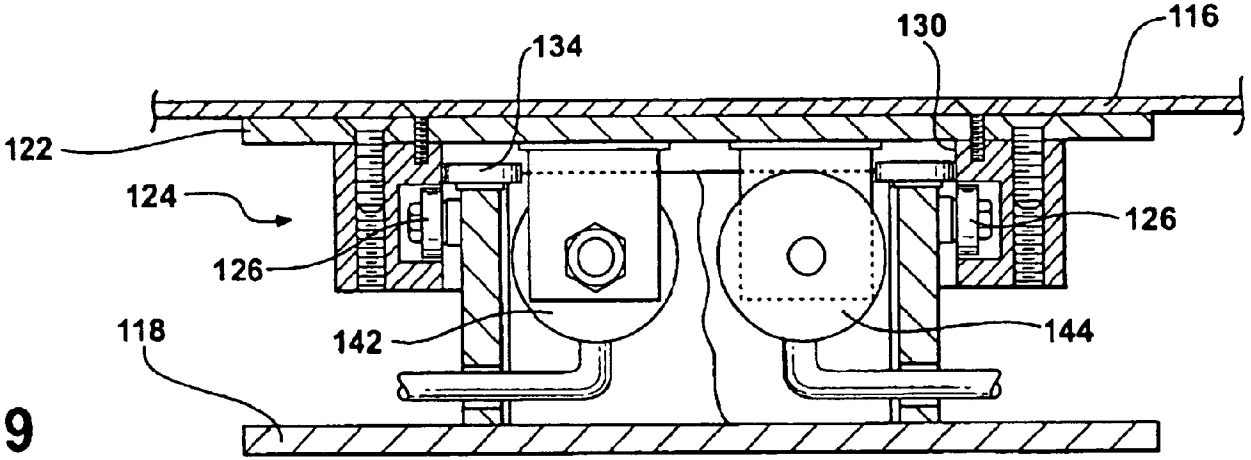
FIG. 9 is a cross-sectional end view of the pneumatically actuated beltless conveyor illustrated in FIG. 8.

An alternate embodiment of the present invention is illustrated in FIGS. 6–9 where like numerals increased by a factor of 100, are used to designate like structure. Thus, as with the conveyor 10 illustrated in FIGS. 1–5, the conveyor 110 illustrated in FIGS. 6–9 includes a housing 112, a drive system, generally indicated at 114 that is supported by the housing 112 and a transport tray, generally indicated at 116 that is operatively supported by the housing 112 for repeated, rectilinear, rhythmic motion as described above. However, and as best shown in FIG. 6, the conveyor 110 includes a pair of transport trays 116 which are mounted to a cross-member 170 that, in turn, is mounted to the slider top plate 122. The cross-member may be an extrusion or any other suitable device for supporting one or more transport trays. In addition and as best shown in FIGS. 7 and 9, the drive system 114 employs a pair of staggered cylinders 140 within which are supported a pair of staggered pistons 142, 144. The use of staggered piston/cylinder arrangement facilitates a shorter length of the drive system 114. The larger pistons/cylinders when compared with those employed with the drive system 114 allow for greater power even though only a pair of pistons is employed. Each piston 142, 144 is used to power the unit in only one direction. Thus, the pistons 142, 144 are powered in opposed directions. Furthermore, the push rods employed in the drive system 114 of the conveyor 110 are directly connected to the slider top plate 122.

The conveyor 110 enjoys all of the advantages as described in connection with the conveyor 10 and is illustrated to show the acceptable variations of the present invention within the scope of the description set forth herein.

Another, alternate embodiment of the present invention is illustrated in FIGS. 10–13, where like numbers increased by a factor of 200 are used to designate like structure with respect to the embodiment illustrated in FIGS. 1–5. Thus, as with the conveyor 10 illustrated in FIGS. 1–5, the conveyor 210 illustrated in FIGS. 10–13 may be employed in any number of applications and neither the preceding discussion nor the description of the invention that follows should be interpreted as limiting the present use of the invention.

Figure 10:
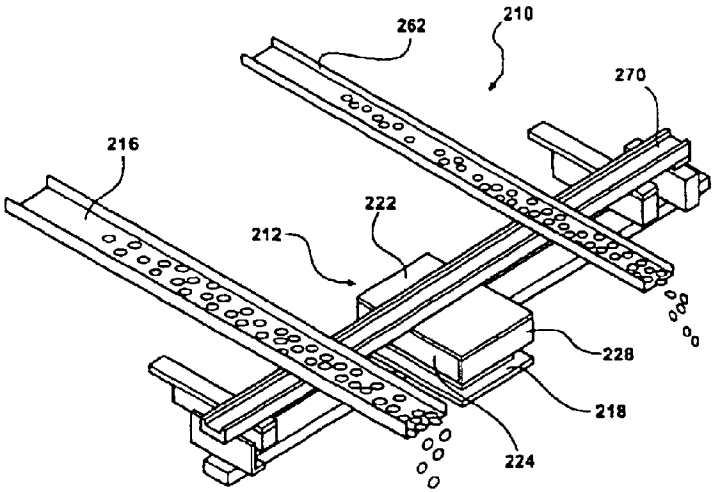
FIG. 10 is a perspective view of still another embodiment of the pneumatically actuated beltless conveyor of the present invention.
Figure 13:
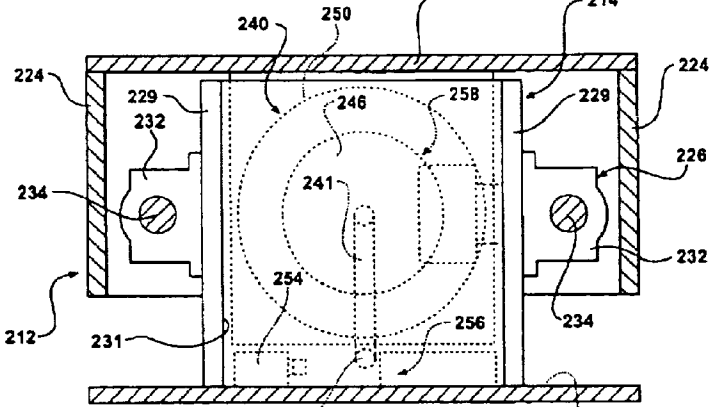
FIG. 13 is a cross-sectional end view of the pneumatically actuated beltless conveyor illustrated in FIG. 10.
Figure 12:
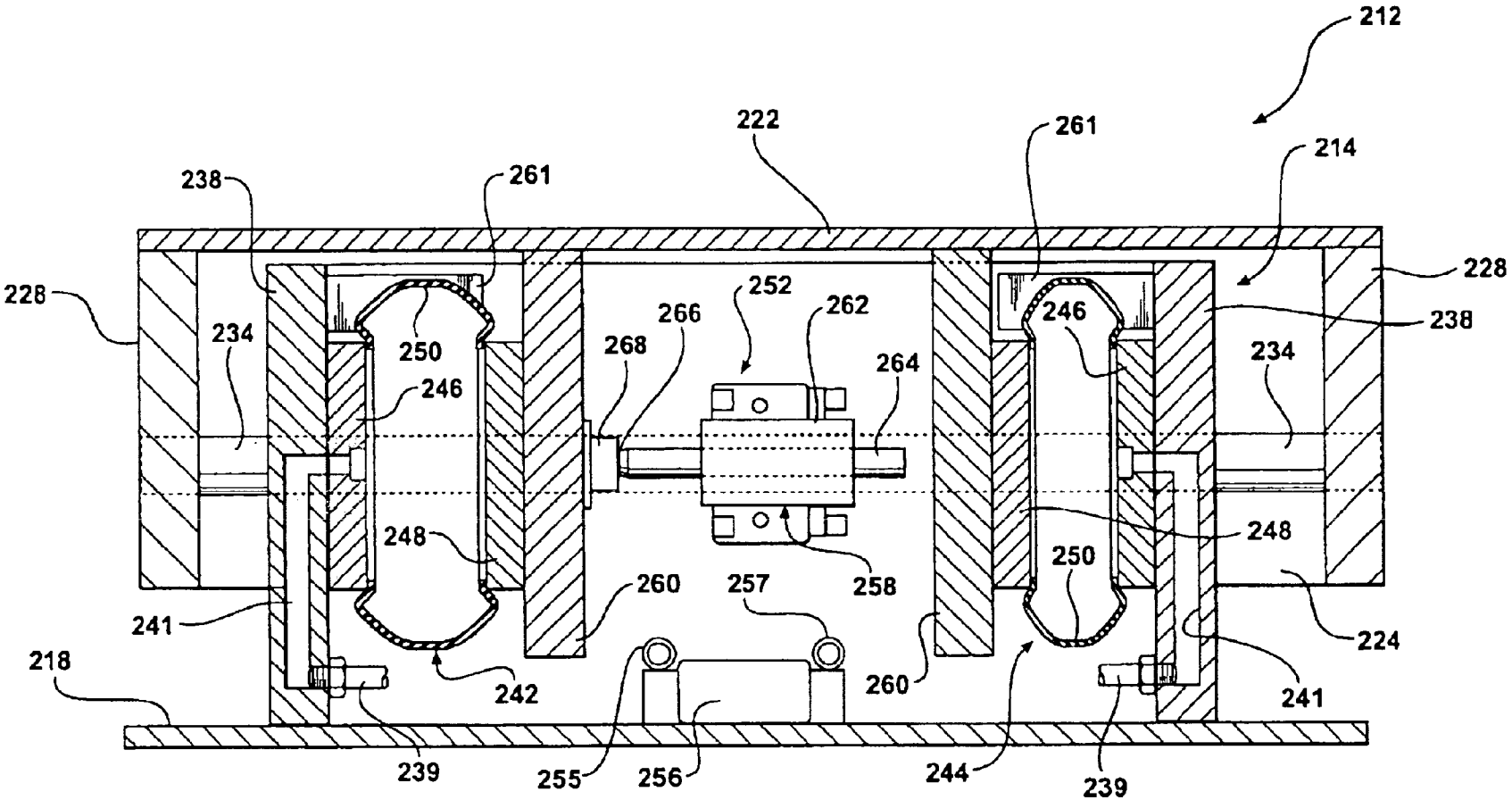
FIG. 12 is a cross-sectional side view of the pneumatically actuated beltless conveyor illustrated in FIG. 10.

Referring specifically to FIG. 10, the conveyor 210 of the present invention includes a housing, generally indicated at 212, and a drive system, generally indicated at 214, that is supported by the housing 212. A transport tray, also known as a rigidized shaker pan, is generally indicated at 216. Like the embodiment illustrated in FIG. 6, the conveyor 210 may include a pair of transport trays 216 that are mounted to a cross member 270 that, in turn, is mounted to the top plate 222 of the housing 212. The transport tray 216 may define any geometric shape and can be fabricated in a number of ways to fit the particular application at hand. As illustrated in FIG. 10, the transport tray 216 has an elongated, rectangular shape with a pair of upstanding flanges 262 extending for a substantial portion of its longitudinal length. The cross member may be an extrusion or any other suitable device for supporting one or more transport trays 216. As best shown in FIGS. 12 and 13, the housing 212 includes a bottom plate 218 and a top plate 222 that is operatively connected to the drive system 212 as will be explained in greater detail below. The transport tray 216 is operatively connected to the top plate 222 so as to be moved in repeated rectilinear fashion by the drive system 214. The housing further includes a pair of drive side plates 224 that depend from the top plate 222 and that extend along at least a portion of the longitudinal length of the top plate 222. In the preferred embodiment, the drive plates 224 extend for the entire length of the top plate 222. In addition, a pair of drive end plates 228 also depend from the top plate 222 and extend between the drive side plates 224.

Like the other embodiments disclosed herein, the drive system 214 includes a seal-less pneumatic engine, generally indicated at 240 that eliminates the need to replace seals that frequently wear out in other conveyors known in the related art. To this end, the seal-less pneumatic engine 240 includes at least one pair of opposed pneumatic drive bellow assemblies 242, 244. One of the pair of pneumatic drive bellow assemblies 242, 244 acts to drive the transport tray 216 in one direction at a first, predetermined speed in such a way that the material supported on the transport tray 216 is advanced in a direction of the length of the tray. The other of the pair of pneumatic drive bellow assemblies 242, 244 acts to drive the transport tray 216 in a second direction, opposite to the first direction and at a second predetermined speed that is different from the first predetermined speed such that the transport tray 216 moves relative to the material supported thereon. Thus, the drive bellow assemblies may move the transport tray 216 faster in one direction and slower in the opposite direction to induce movement of material or parts supported on the transport tray 216 in the direction of the conveyor 210. While only a pair of pneumatic drive bellow assemblies is illustrated in these figures, those having ordinary skill in the art will appreciate that any number of such assemblies may be employed as dictated by other design considerations. In addition, like the operation of the embodiments described in connection with FIGS. 1–9, those having ordinary skill in the art will appreciate that the relative speeds (faster in one direction and slower in the opposite direction) selected for forward and rearward movement of the transport tray 216 may be reversed and still cause the material on part supported on the transport tray 216 to move in the direction of the conveyor 210. This is achieved due to the inertia of the material or part that tends to cause movement in the direction of the conveyor even as the direction of movement of the transport tray 216 is reversed.

The drive system 214 also includes a pair of end manifolds 238. Each manifold 238 includes an air inlet 239 that is operatively connected to a source of pressurized air (FIGS. 12 and 13). Delivery passages 241 that are operatively connected to the air inlet 239 are formed through the manifolds 238 for this purpose. The pair of end manifolds 238 provide fluid communication between the source of pressurized air and the pair of pneumatic drive bellow assemblies 242, 244 as will be described in greater detail below.

Figure 11:
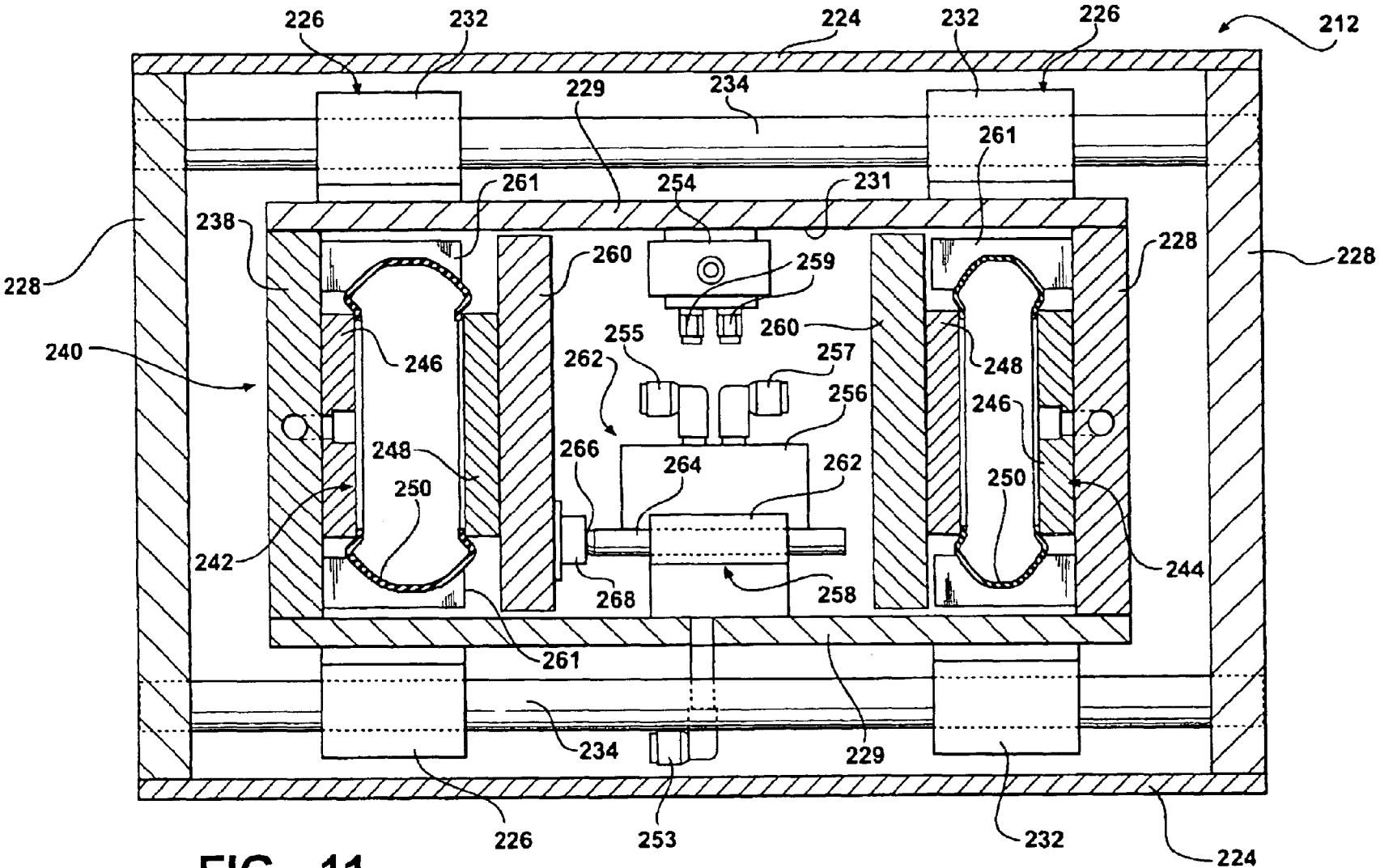
FIG. 11 is a cross-sectional top view of the pneumatically actuated beltless conveyor illustrated in FIG. 10.

As best shown in FIGS. 11 and 13, the housing 214 includes a pair of inner side plates 229 that are fixedly mounted to the bottom plate 218. The manifolds 238 are also supported on the bottom plate 218. The pair of inner side plates 229 extend between the pair of manifolds 238 such that, together with the manifolds, the inner side plates 229 act to define an enclosure 231. The seal-less pneumatic engine 240 is supported by the housing 212 within this enclosure 231. The housing 212 further includes at least one linear bearing assembly, generally indicated at 226, that is operatively supported by the housing 212 and acts to support the top plate 222 in such a way as to provide repeatable, smooth rectilinear movement relative to the bottom plate 218. More specifically, in the preferred embodiment illustrated in these figures, two pair of linear bearing assemblies 226 are supported by the housing 212 in spaced relationship with respect to one another on either side of the pneumatic engine 240. To this end, each linear bearing assembly 226 includes a bearing housing 232 that is fixedly mounted to the inner side plates 229 of the housing 212. A shaft 234 is moveably supported for rectilinear movement relative to the bearing housing 232. Furthermore, each shaft 234 extends between the pair of drive end plates 228 to which they are operatively connected.

Each of the drive bellow assemblies 242, 244 includes a fixed plate 246 that is operatively mounted to the housing 212. In the embodiment illustrated in FIGS. 10–13, each fixed plate 246 is mounted to an associated manifold 238 via fasteners or any other suitable means. In addition, the pneumatic drive bellow assemblies 242, 244 include a moveable plate 248 that is operatively connected to the transport tray 216. An annular, flexible membrane 250 extends between the fixed and moveable plates 246, 248. The delivery passages 241 also extend through each of the fixed plates 246. Thus, the flexible membrane 250 is in fluid communication with the source of pressurized air through the manifolds 238 so as to expand and contract. The expanding and contracting action of the moveable membrane imparts repeated rectilinear movement to the transport tray 216 through the moveable plates 248. To this end, the drive system 214 further includes a pair of drive dogs 260. Each of the pair of drive dogs 260 is associated with a corresponding one of the pair of pneumatic drive bellow assemblies 242, 244. More specifically, each of the pair of drive dogs 260 is operatively connected to a corresponding one of the moveable plates 248 of an associated drive bellow assemblies 242, 244 as well as with the top plate 222 of the housing 212 via fasteners or any other suitable means commonly known in the art. Thus, the pair of drive dogs 260 act to operatively interconnect their associated pneumatic drive bellow assemblies 242, 244 to the transport tray 216. The conveyor assembly 210 may also include a plurality of bumper mechanisms or stops 261 that are disposed between the fixed manifolds 238 and the drive dogs 260. In the preferred embodiment, two or more bumpers 261 may be employed in connection with each bellows assembly 242, 244. The bumpers 261 act to limit the distance traveled by the drive dogs 260 in the direction that the flexible membranes 250 contract.

The drive system 214 further includes a control valve assembly 252 that operates to sequentially cycle pressurized air to alternating ones of the pair of opposed pneumatic bellow assemblies 242, 244 through the air delivery passages 241 formed in the manifold 238 and fixed plates 246. The sequentially delivered, alternating pressurized air acts on the flexible membranes 250 in such a way that the membranes 250 expand and contract so as to induce repeated, rectilinear movement of the moveable plates 248. To this end, the control valve assembly 252 includes a pneumatic valve 256 and a pneumatic switch 258. As best shown in FIG. 11, an air inlet 253 provides fluid communication between the pneumatic valve 256 and a source of pressurized air. The pneumatic valve 256 also includes a pair of outlets 255, 257 that provide fluid communication between the pneumatic valve 256 and the flexible membranes 250 of each drive bellows assembly 242, 244, respectively, via the manifold inlet 239 and delivery passages 241 extending therein.

The pneumatic switch 258 is operable to send signals to the pneumatic valve 256 to change the delivery path of pressurized air from one pneumatic drive bellow assemblies 242 to the other 244. In addition, this arrangement is further operable to change the delivery path from the drive bellow assembly 244 back to the other 242. The pneumatic switch 258 includes a housing 262 that is in fluid communication with the pneumatic valve 256 via any suitable means such as conduits or tubing. A shaft 264 is moveably supported by the switch housing 262 and extends for a predetermined length that is shorter than the distance between the drive dogs 260. The shaft 264 is responsive to actuation of at least one of the pair of pneumatic drive bellow assemblies 242, 244 so that it moves relative to the housing 262. In the embodiment illustrated in these figures, the shaft 264 is responsive to the bellows assembly 242. Movement of the shaft 264 relative to the housing 262 initiates a pneumatic signal from the switch 258 to the pneumatic valve 256. This signal causes the control valve to change the flow path of pneumatic pressure between the drive bellow assemblies 242, 244.

The shaft 264 is operatively connected to its associated drive bellow assembly in such a way that it automatically accommodates wear and change in stroke length of the bellow assembly. More specifically, the shaft 264 includes at least one arcuate end 266. A magnet 268 is operatively mounted to the drive bellow assembly 242. In the preferred embodiment, the magnet 268 is mounted to the drive dog 260 which, in turn, is mounted to the moveable plate 248. The arcuate end 266 of the shaft 264 is attracted to the magnet 268. This establishes a magnetic connection between the shaft 264 and the drive bellow assembly 242. This connection also automatically accommodates for changes in the operating parameters of the bellows assembly due to wear or any number of other factors. Thus, the connection between the pneumatic switch and the drive bellow assemblies is sufficiently flexible so that this feature improves the operational life span of the conveyor assembly 210 of the present invention.

A pneumatic exhaust valve 254 is in fluid communication with each one of the pair of pneumatic drive bellow assemblies 242, 244 via exhaust ports 259. The pneumatic exhaust valve 254 is employed to vent pneumatic pressure from the drive bellow assemblies to the atmosphere. More specifically, the exhaust valve 254 acts to vent pneumatic pressure from the flexible membranes 250 to atmosphere.

In its operative mode, a source of pressurized air is provided to the pneumatic valve 256 via the inlet 253. Depending on the signals provided by the pneumatic switch 258, pressurized air is alternatingly supplied to one 242 or the other 244 of the pneumatic drive bellow assemblies via the inlet 239 to the air delivery passages 241 extending through the manifold 238 and fixed plates 246. Pressurized air delivered to the bellow assemblies in this fashion causes the annular, flexible membranes 250 to expand thereby moving its associated drive dog 260 in one linear direction. This movement is translated to the transport tray 216 via the top plate 222 via any cross member 270, if one is employed. When the bellows assembly 242 expands, the opposed bellow assembly 244 contracts as illustrated in FIGS. 11 and 12. Air is exhausted from the annular flexible membrane 250 of the bellows assembly 244 via the exhaust valve 254. When the bellow assembly 242 expands, the shaft 264 of the pneumatic switch 258 is moved linearly relative to its housing 262. At the point when the bellows assembly 242 has reached its fully extended position, the shaft 264 triggers a pneumatic signal that is delivered to the pneumatic valve 256. In response to this signal, the pneumatic valve 256 reverses the direction of pressurized air from the bellows assembly 242 to the bellows assembly 244. When this occurs, the flexible membrane 250 of the bellows assembly 244 expands in a direction opposite to that imparted by the bellows assembly 242. At the same time, the pressurized air found within the flexible membrane 250 of the bellows assembly 242 is exhausted through the exhaust valve 254. In this way, rhythmic, repeating, rectilinear movement is imparted to the transport tray 216.

The pneumatically actuated beltless conveyor 10, 110, 210 of the present invention is inexpensive, lightweight and designed to handle small parts and materials such as metal stamping, chips and turnings. The transport tray 16, 116, 216 is moved in a repeated, rectilinear, rhythmic motion relatively slowly forward and then quickly backwards or quickly forward and then slowly backward. In either case, this movement advances the material on the transport tray 16, 116, 216 in the direction of the forward movement of the transport tray. The pneumatically actuated beltless conveyor 10, 110, 210 of the present invention employs a seal-less engine for its drive system 14, 114, 214 thereby eliminating the need for replacement seals. The pneumatically actuated conveyor requires approximately 50–150 psi air supply to operate and includes an external regulator as well as a filter assembly for removing contaminate from the air supply. The present invention is easily and quickly mounted in a number of different applications and includes an adjustable speed control. It is lightweight and is easily moved from one location to another.

The invention has been described in an illustrative manner. It is to be understood that the terminology which has been used is intended to be in the nature of words of description rather than of limitation. Those having ordinary skill in the art will appreciate that many modifications and variations of the invention are possible in light of the above teachings. Therefore, within the scope of the appended claim, the invention may be practiced other than as specifically described.

What is claimed is:

1. A sealess conveyor drive for moving a conveyor member to move objects along the conveyor member comprising:

a driven member for operative connection to the conveyor member;

a pair of opposed pneumatic *bellow* assemblies operatively connected to said driven member, each of said pneumatic *bellow* assemblies having an air inlet, wherein one of said pneumatic *bellow* assemblies acts to drive said driven member in one direction to advance objects supported on the conveyor member and the other of said pneumatic *bellow* assemblies acts to drive said driven member in a second direction opposite to said first direction such that the conveyor member moves relative to the objects supported thereon; and a control valve that is operatively connected to a source of pressurized air and in fluid communication with said air inlet of each of said pneumatic *bellow* assemblies, wherein said control valve operates to sequentially cycle pressurized air to alternating ones of said pneumatic *bellow* assemblies so as to induce repeated, rectilinear movement of the conveyor member.

2. A sealess conveyor drive as set forth in claim 1 wherein said control valve comprises a pneumatic valve.

3. A sealess conveyor drive as set forth in claim 2 including at least one switch, said switch being operable to send signals to said pneumatic valve to change the delivery path of pressurized air from one pneumatic assembly to the other.

4. A sealess conveyor drive as set forth in claim 3 wherein said at least one switch is a pneumatic switch that is in fluid communication with said pneumatic valve.

[5. A sealess conveyor drive as set forth in claim 1 wherein each of said pneumatic assemblies comprises a cylinder having a bi-directional piston disposed therein.]

[6. A sealess conveyor drive as set forth in claim 1 wherein each of said pneumatic assemblies comprise a bellow.]

[7. A sealess conveyor drive as set forth in claim 6 wherein said bellow is a pneumatic bellow.]

8. A sealess conveyor drive as set forth in claim [6] *1* wherein said bellow of each of said pneumatic assemblies is mounted coaxially.

9. A sealess conveyor drive as set forth in claim 1 including a pair of end manifolds providing fluid communication between the source of pressurized air and said pneumatic assemblies.

10. A conveyor for moving objects comprising:

a housing;

a driven member movably mounted relative to said housing;

a first sealess pneumatic *bellow* assembly and a second sealess pneumatic *bellow* assembly each operatively connected to said driven member and mounted in said housing, said first sealess pneumatic *bellow* assembly and said second sealess pneumatic *bellow* assembly each having an air inlet, wherein one of said first sealess pneumatic *bellow* assembly and said second sealess pneumatic *bellow* assembly acts to drive said driven member in one direction and the other of said first sealess pneumatic *bellow* assembly and said second sealess pneumatic *bellow* assembly acts to drive said driven member in a second direction opposite to said first direction; and a control valve that is operatively connected to a source of pressurized air and in fluid communication with said air inlet of said first sealess pneumatic *bellow* assembly and said second sealess pneumatic *bellow* assembly, wherein said control valve operates to sequentially cycle pressurized air to alternating ones of said first sealess pneumatic *bellow* assembly and said second sealess pneumatic *bellow* assembly so as to induce repeated, rectilinear movement of said driven member.

11. A conveyor as set forth in claim 10 wherein said control valve comprises a pneumatic valve.

12. A conveyor as set forth in claim 11 including at least one switch, said switch being operable to send signals to said pneumatic valve to change the delivery path of pressurized air from one of said first sealess pneumatic assembly and said second sealess pneumatic assembly to the other.

13. A conveyor as set forth in claim 12 wherein said at least one switch is a pneumatic switch that is in fluid communication with said pneumatic valve.

[14. A conveyor as set forth in claim 10 wherein each of said first sealess pneumatic assembly and said second sealess pneumatic assembly comprises a cylinder having a bi-directional piston disposed therein.]

[15. A conveyor as set forth in claim 10 wherein each of said first sealess pneumatic assembly and said second sealess pneumatic assembly comprises a bellow.]

[16. A conveyor as set forth in claim 15 wherein said bellow of each of said first sealess pneumatic assembly and said second sealess pneumatic assembly comprises a pneumatic bellow.]

17. A conveyor as set forth in claim [15] *10* wherein said bellow of each of said first sealess pneumatic assembly and said second sealess pneumatic assembly is mounted coaxially.

18. A conveyor as set forth in claim 10 including a pair of end manifolds providing fluid communication between the source of pressurized air and each of said first sealess pneumatic assembly and said second sealess pneumatic assembly.

19. A conveyor as set forth in claim 10 including a conveyor member operatively connected to said driven member.

20. A method for moving objects comprising:

providing a conveyor including a conveyor member and a sealess conveyor drive operatively connected to the conveyor member, said sealess conveyor drive having a driven member, a pair of opposed pneumatic *bellow* assemblies operatively connected to the driven member, each of the pneumatic *bellow* assemblies having an air inlet, and a control valve in fluid communication with the air inlet of each of the pneumatic assemblies[:]*;* providing a fluid source;

connecting the fluid source to the control valve;

activating the control valve such that the fluid flows from the fluid source into the inlet of one of the pneumatic *bellow* assemblies to drive the driven member in one direction to advance objects supported on the conveyor member;

activating the control valve such that the fluid flows from the fluid source into the inlet of the other of the pneumatic *bellow* assemblies to drive the driven member in a second direction opposite to the first direction such that the conveyor member moves relative to the objects supported thereon; and placing the objects on the conveyor member and repeating said steps of activating so as to induce repeated, rectilinear movement of the conveyor member for moving the objects along the conveyor member.

* * * * *